Figure 1:
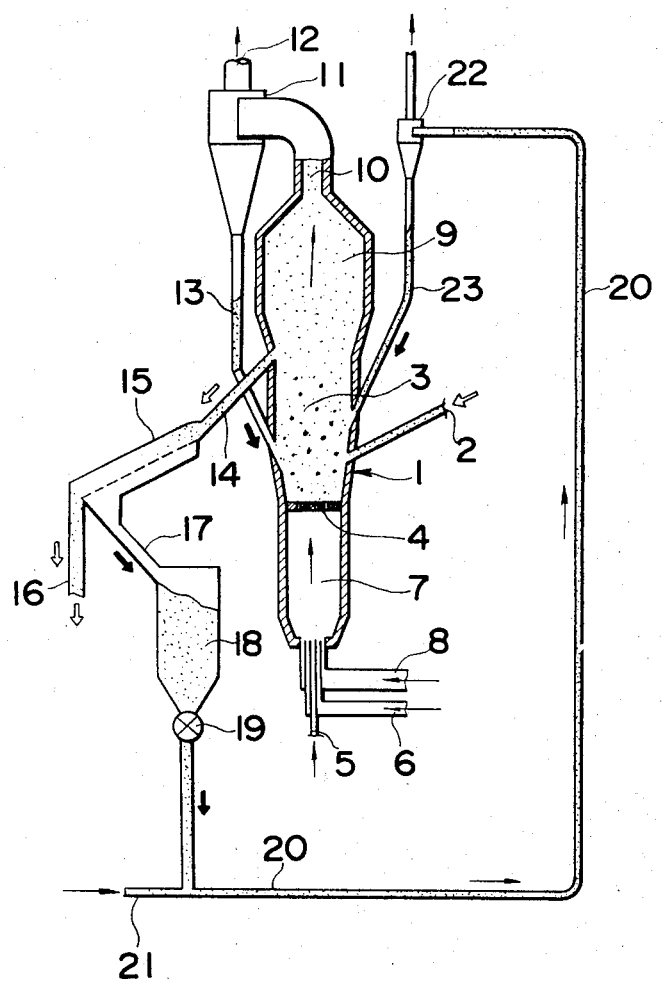

United States Patent [19]

Ninomiya et al.

[11] 3,852,216
[45] Dec. 3, 1974

[54] PROCESS FOR PRODUCING COARSE PARTICLES OF ACTIVE CARBON IN A FLUIDIZED BED WITH ADDED INERT PARTICLES

[75] Inventors: Nobutaka Ninomiya, Kyoto; Daizo Kunii, Tokyo, both of Japan

[73] Assignee: Takeda Chemical Industries, Ltd., Osaka, Japan

[22] Filed: Aug. 31, 1972

[21] Appl. No.: 285,363

[30] Foreign Application Priority Data
Sept. 4, 1971   Japan................ 46-68417

[52] U.S. Cl..................... 252/421, 201/20, 201/31, 252/445, 423/449
[51] Int. Cl............................................. C01b 31/08
[58] Field of Search ............ 252/421, 445; 423/449, 423/445; 201/20, 12, 31

[56] References Cited
UNITED STATES PATENTS
3,541,025   11/1970   Oda et al. ........................... 252/421
3,565,827   2/1971   Friday ............................... 252/421

FOREIGN PATENTS OR APPLICATIONS
704,810   3/1954   Great Britain ..................... 252/421
1,119,238   12/1961   Germany ............................ 252/421

Primary Examiner—Daniel E. Wyman
Assistant Examiner—P. E. Konopka
Attorney, Agent, or Firm—Wenderoth, Lind & Ponack

[57] ABSTRACT

Process for producing coarse particles of active carbon having an average particle size of 2 to 20 mm by means of a fluidized bed in a reactor in which particles of carbon or carbonaceous material are mixed with a finely powdered inert material having a preferable particle size of 0.08 to 1.0 mm and caused to move upward at low speed by passing a high temperature gas containing steam through the mixture forming the fluidized bed, thereby to obtain activation of the carbonization of the carbon particles with good effect.

4 Claims, 2 Drawing Figures

PROCESS FOR PRODUCING COARSE PARTICLES OF ACTIVE CARBON IN A FLUIDIZED BED WITH ADDED INERT PARTICLES

The present invention relates to a process for producing coarse particles of active carbon and, more particularly, to a process for producing coarse particles of active carbon having an average particle size of 2 to 20 mm by means of a reactor in which a fluidized bed is formed with the particles and a fluid flowing therethrough.

There is a well known the method of producing active carbon from coconut shell charcoal, sawdust charcoal, coal, briquettes, or the like, in finely powdered form or fine granule or using a fluidized bed in which the particles making a bed of graunles are caused to move gradually upward by a fluid flowing up through the bed in a known manner. However, application of this method is difficult, when the usual fluidized bed of the type above referred to is employed, for the production of active carbon from a starting material in the form of coarse granule having a particle size of 2 to 20 mm, because the flow velocity of fluid per section area of the fluidized bed must be large so as to fluidize the coarse granules, with the result that the reaction rate of the gas face is lowered and merely the surface of the granules is activated and the adsorption level of the product active carbon is lowered. In addition, if the activation reaction for the granules is longer than an ordinary period by this method, the activation cannot be developed at the center portion of the granules and at the surface of the granules the strength is extremely reduced, so that destruction and erosion of the carbon particles from the granules occur when they are vigorous stirred under fluidization, and the obtained product is in the form of powder or granule with low strength, which is readily dispersed, and remains as an active carbon with low activity only, having inert cores.

For reducing the flow velocity of fluid per section area of the fluidized bed, provision of an agitator in the fluidized bed has been proposed, but, in this case, the activation reaction is developed merely at the surface of the granules excluding the center portion, when the particle size of the granules is 2 mm or more, and frequent mechanical impact among the granules causes the destruction and erosion of the carbon particles. Though, for production of active carbon from a starting material in the coarse granule form having a particle size of 2 mm or more, a reactor of rotary kiln type has been heretofore been employed, such a reactor is disadvantageous to effective contact between granule and fluid and to sufficient heat efficiency so that a large reactor is necessitated for it.

In view of these disadvantages, the inventors have made extensive investigations and now accomplished the present invention.

Accordingly, the present invention provides a process for producing coarse particles of active carbon having an average particle size of 2 to 20 mm which comprises introducing gas of a temperature within the range of 600° to 2000°C containing 20 to 80 percent by volume of steam into a system comprising particles of carbon or carbonaceous material having an average particle size of 2 to 20 mm and mixed with 1.00 to 4 times, preferably, about 0.02 to 4 times volume of a finely powdered inert material, executing the activation or the carbonization and activation of said system while forming a fluidized bed, and separating the produced coarse particles of active carbon from the finely powdered inert material.

For the process of the present invention in the reactor there is provided a mixture comprising coarse particles of carbon or carbonaceous material having a large particle size and finely powdered inert material having a small particle size. Such a mixture in the fluidized bed can be gradually moved upward by the gas at a low speed almost the same as that at which only the inert material is moved by the same gas without separation between large particles and small particles, so that large particles can be in contact with the gas for a sufficiently long period to be carbonized completely and there is no destruction or erosion of the carbon particles.

According to the present invention, a fluidized bed can be effectively formed without any mechanical operation such as stirring with an agitator, and the reaction rate in the part of gas for the carbon or hydrocarbon material can be maintained at a high level. Further, sufficient activation extends to the inside of the granule, and there is almost no destruction or erosion of the starting material or the produced active carbon during or after the reaction. In addition, leakage of finely powdered carbon from the reactor can be prevented, and the formed hydrogen and carbon monoxide are completely burned without escape from the reaction system, to generate heat energy, which is not only advantageous from the economic viewpoint, but also results in avoidance of undesirable atmospheric pollution.

As starting carbon or carbonaceous material in the coarse granule form, there may be used any substance conventionally employed for production of active carbon, such as coconut chell charcoal, sawdust charcoal, cokes or anthracite coal. The starting material is preferred to have an average particle size of 2 to 20 mm.

The inert material in the finely powdered form to be used with the starting material may be a substance which does not interfere with the reaction and can be readily separated from the produced active carbon. Examples of such substance are alumina, silica, silica-alumina, thermostable metal oxide, sodium chloride and potassium chloride. It is desired that the particles of the inert material are spherical and have an uniform particle size in a range of 0.05 to 2.0 mm, preferably, 0.08 to 1.0 mm, on the average.

The amount of the inert material in finely powdered form to be used is about 20 to 400 percent by volume, preferably, about 40 to 200 percent by volume, more preferably, 120 to 200 percent by volume, to the starting material.

The gas to be introduced into the reactor is maintained at about 600° to 2000°C, favorably, about 800° to 1400°C, and contains about 20 to 80 percent by volume, preferably, about 30 to 60 percent by volume, of steam. Examples of such a gas are combustion gas obtained by the combusion of heavy oil, kerosene, natural gas, LPG, coal, tar or tar oil, sawdust or the like, a waste gas discharged from a burning furnace of industrial waste matters or a hot waste gas discharged from calcination furnace, heating furnace or reaction furnace, if necessary, in admixture with a designed amount of steam.

Alternatively, there may be advantageously employed a hot gas obtained by burning, outside the reaction system, the gas which is discharged from the reactor employed in the method of the present invention, if necessary, admixed with a designed amount of steam.

The introduction velocity of the hot gas is selected from a range smaller than the initiation velocity of the fluidization of the starting material and larger than that of the inert material, for example, from 0.10 to 1.0 m/sec., preferably, from 0.15 to 0.6 m/sec.

In the method of the present invention, a vertical reactor is usually employed. The starting material in coarse granule form and the inert material in finely powdered form are charged into the reactor through a supply tube, and hot gas containing steam is introduced into the reactor from the bottom of the reactor to form a fluidized bed, whereby the inside of the reactor is kept at 600° to 1000°C.

Alternatively and occasionally, the reactor may be provided with a combustion chamber, into which the raw material necessary to obtain the gas upon combustion, if necessary, together with steam, is introduced and burned, and the obtained hot gas is then introduced into the reactor from the bottom of the reactor.

Thus, in case of using carbon material as the starting material, activation is executed in the reactor, and in case of a carbonaceous material, carbonization and activation occur, to produce coarse particles of active carbon.

The resultant active carbon is taken out, together with the inert material, to the outside of the reaction system from approximately the middle of the reactor and separated from the inert material, the latter being recycled into the reactor. From the upper part of the reactor, the formed gas accompanying the inert material is taken out, and after separating them, the inert material is recycled into the reaction system and the gas is again supplied into the combustion chamber at the bottom part of the reactor so as to be heated, if necessary together with steam, to obtain a hot gas. The foregoing operations are usually executed continuously.

As the case may be, two or more reactors may be in a parallel arrangement employed so that the mixture of the resultant active carbon and the inert material is successively supplied into the adjacent reactor. Alternatively, the reactor may be divided into two or more rooms by the use of partitions and, in this case, the mixture of the active carbon and the inert material obtained in one room may be introduced into the adjacent room through a transporting tube which extends between said rooms through the partition.

Figure 2:
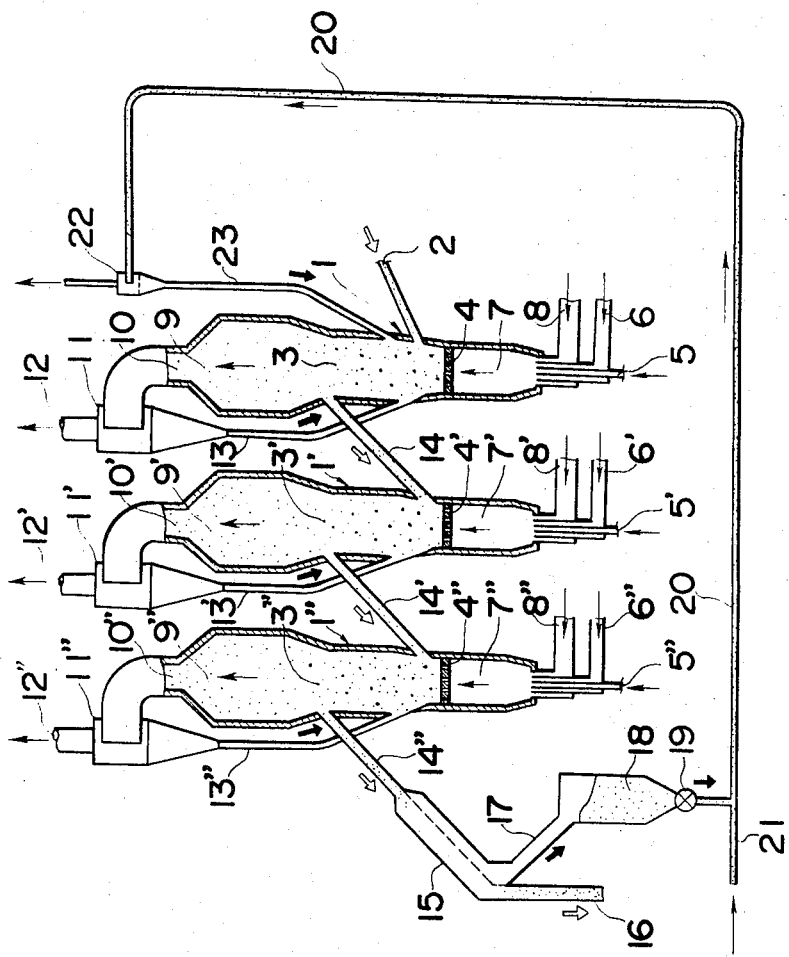

The present invention will be hereinafter fully described in conjunction with various preferred embodiments of apparatuses for use to perform a process fo the present invention with reference to the accompanying drawings, in which;

FIG. 1 is a schematic sectional view, partially broken away, of the essential portion of an apparatus in one embodiment for use in a process of the present invention, and FIG. 2 is a view of another embodiment similar to FIG. 1.

Before the description of the present invention proceeds, it is to be noted that like parts, for the sake of brevity, are designated by like reference numerals throughout the several views of the accompanying drawings.

A basic construction and operation of an apparatus to which the present invention can be applicable will be first described with reference to FIG. 1.

Referring now to FIG. 1, a reactor 1 includes a cylindrical body whose section area is preferably larger in the upper portion, a plurality of tubes connected with the periphery of the cylindrical body and a gas rectifier 4 provided horizontally across the lower portion of the cylindrical body to divide it into two portions, that is, a fluidized bed 3 and combustion room 7. The starting material of carbon or carbonaceous material in raw granule form having an average particle size of 2 to 20 mm is fed from a supply tube 2 into lower portion of the fluidized bed 3 formed at the middle portion of the reactor 1 by a conventional supply means. Preferably, the starting material is preheated by a suitable device before feeding to the reactor 1. In the fluidized bed 3 the starting material is fluidized by an activation gas of 800° to 2000°C introduced from the combusion room 7 through the gas rectifier 4 in a known manner, and the activation of the starting material is executed on the fluidized bed 3 within the range of temperature of 750° to 1000°C. In the fluidized bed 3, there is additionally provided an inert material in the form of a fine powder having an average particle size of 0.05 to 2.0 mm in the amount of 20 to 400 percent by volume to the starting material. Both the starting material and inert material are equally fluidized in their mixed condition in which the flowing velocity between them is smaller than the initiation velocity of fluidization of the starting material.

The activation gas is a high temperature gas of 800° to 2000°C containing a large amount of steam, and an example of a manner of its generation is shown in FIG. 1, in which a gaseous fuel and air of room temperature or preheated are respectively fed from supply tubes 5 and 6 into the combustion room 7 to burn, if necessary, being supplied with a saturated or overheated steam from a supply tube 8 to mix with the high temperature gas which is adjusted to contain 20 to 80 percent by volume of steam at the range of temperature 800° to 2000°C, and supplied into the fluidized bed 3 through the gas rectifier 4. As the high temperature gas flowing through the fluidized bed 3 into the upper space of the reactor 1 after activation is accompanied by the inert material in the finely powdered form, the high temperature gas is discharged from the exit 12 of a cyclon catcher 11, in which the inert material is separated from the high temperature gas, to the outside through the exit 10 of the reactor 1. The high temperature gas exhausted is utilized in a subsequent process such as a heat exchanger. The inert material separated from the high temperature gas in the cyclon catcher 11 is fed back to the fluidized bed 3 in the reactor 1 through a stand tube 13 provided between the outlet of the cyclon catcher 11 and an inlet of the reactor 1 provided at the center portion thereof. The mixture of the active carbon and the inert material in the upper portion of the fluidized bed 3 in which most of the carbon is activated is continuously discharged through an exhaust tube 14 connected with the upper portion of the reactor 1 and introduced into an apparatus 15 for separation of coarse granules and fine powders. An example of such an apparatus 15 is shown in FIG. 1, in which the active carbon in coarse granule form and the inert material in the form of fine powder are continuously separated from each other by means of an inclined porous plate or a inclined wire netting having many holes through which the inert material is automatically dropped. The separated active carbon automatically slides on the upper surface of the inclined porous plate so as to be taken out from the outlet tube 16 while the inert material which has dropped through the holes of the inclined porous plate is introduced through a conduit 17 into a hopper 18 and transported by means of, for example, a rotary supplier 19 to a transport tube 20 through which the inert material is in turn transported to a cyclon catcher 22. Blow gas is additionally introduced into the transport tube 20 to forcibly deliver the inert material, which is continuously supplied from the rotary supplier 19, through the transport tube 20 to the cyclon catcher 22. The inert material separated in the cyclon catcher 22 from the blow gas is fed back to the lower portion of the fluidized bed 3 in the reactor 1 through a stand pipe 23 connected with the middle portion of the reactor. With this arrangement, the active carbon in the coarse granule form is continuously taken out from the outlet 16 while the inert material in the form of the fine powder is circulated through the reactor 1, separate apparatus 15 and cyclon catchers 11 and 22.

The apparatus shown in FIG. 1 consists of a single reactor, but multiple reactors each comprising a fluidized bed may be employed as shown in FIG. 2. Now referring to FIG. 2, an essential feature of this embodiment resides in the provision of three reactors 1, 1' and 1" in which the exhaust tubes 14 of the first and second reactors 1 and 1' are respectively connected with the supply tubes of the second and third reactors 1' and 1", and the separate apparatus 15 and transport tube 26 are simply provided between the exhaust tube 14" of the third reactor 1" and the stand pipe 23 of the reactor 1. In this arrangement, the mixture of the partially activated carbon and the inert material discharged through the exhaust tube 14 from the upper portion of the fluidized bed 3 of first reactor 1 is introduced into the lower portion of the fluidized bed 3' of the second reactor 1', the mixture discharged through the exhaust tube 14' from the upper portion of second reactor 1' is introduced into the lower portion of the third reactor 1", and the mixture dischaged through the exhaust tube 14" from the upper portion of the third reactor 1" is introduced into the separate apparatus 15 for separating coarse granules from fine powders, from which the active carbon in the coarse granule form is continuously taken out from the outlet 16 while the inert material in the form of fine powder is fed back into the lower portion of first reactor 1 through a conduit 17, hopper 18, rotary supplier 19, transport tube 20, cyclon catcher 22 and stand pipe 23 in succession.

Although this embodiment of FIG. 2 described hereinbefore is provided three reactors connected in series with each other, the number of the reactors is not to be limited thereby, and may be two or four or more. Moreover, in place of using two or more separate reactors as shown in FIG. 2, it is possible to adopt a reactor in which the fluidized bed is divided into two or more rooms by means of partitions, each room being connected in series with the next by passages provided on the partitions, to realize the same effect as in FIG. 2. Preferably, in an apparatus comprising two or more fluidized beds as shown in FIG. 2, the condition of each reactor such as temperature of the fluidized bed or flowing velocity of the high temperature gas is varied in accordance with proceeding of activation of the carbon. Also, it is not necessary for the starting material supplied from the supply tube 2 into the first fluidized bed 1 to have been dried up by distillation or carbonized, and a material such as sawdust charcoal, charcoal, coal, lignite coal or brown coal which is not dried up by dry distillation and has a particle size of 2 to 20 mm or a molded pellet which is not carbonized may be used. In such an apparatus, drying by dry distillation or carbonization for the starting material is executed in the first fluidized bed and the activation is accomplished in the subsequent fluidized beds.

Though, in the apparatus as shown in FIGS. 1 and 2, the separation of the active carbon and the inert material discharged from the exhaust tube 14 is executed by the use of the inclined porous plate or wire netting in the separate apparatus, the separation method is not limited to this, and other separation means may also been employed. For example, separation is executed using a moving bed of the active carbon produced in a vertical separation apparatus into which an appropriate amount of gas is supplied so as to separate the active carbon in the coarse granule form and the inert material in the finely powdered form in such a manner that at the higher portion of the moving bed, by keeping the active carbon in the fluidized state or an initial state of the fluidization, the inert material present in admixture with the active carbon is accompanied upward with the supplied gas and separated while at the lower portion of the moving bed, by appropriately adjusting the amount of the supplied gas, the inert material present between the active carbon is transferred upwardly and the active carbon is kept in the state before initiation of fluidization and is taken downwardly, and out to the outside. The inert material accompanying the supplied gas in the separate apparatus is introduced into a cyclon catcher so as to be separated and fed back into the fluidized bed of the reactor. As another example, separation may also be executed by means of a gas rectifying plate placed horizontally or with a little inclination and having a lot of small holes through which a separating gas is fed from the lower inlet to the upper outlet so as to separate the active carbon and the inert material, and the active carbon is taken out from the outlet tube to the outside while the inert gas accompanied with the separating gas is introduced into a cyclon.

While the arrangement so far described, it is clear that an excellent active carbon can be continuously produced from the starting material such as coconut shell charcoal, sawdust charcoal, charcoal, coal or lignite having an average particle size of 2 to 20 mm using a fluidized bed convenient for the control of the reaction temperature in the reactor and the operation can be under completely sealed conditions, so that production of the active carbon can be realized without any harmful influence to public.

EXAMPLE 1

Into a reactor built of a thermostable steel tube of 150 mm in inner diameter and of 300 mm in height as shown in FIG. 1, there is fed charcoal in pellet form of 5 mm in average particle size, which has been separately carbonized for 5 hours, by gradual elevation of temperature from room temperature up to 800°C at a rae of 272 g/hr. on a rectifier provided in the reactor.

From the lower part of the reactor, a high temperature gas of 1360°C containing 58 percent by volume of steam is introduced to the upper part through the rectifier made of refractory material at an apparent velocity of 20 cm/sec. per section area of the rectifier so as to form a fluidized bed of charcoal on the rectifier in the reactor. Into the reactor, there is also charged alumina in the form of spherical granules having an average particle size of 0.12 mm and of 1.2 times the volume of the charcoal and the active carbon thereof in the coarse granule form presented in the fluidized bed of the reactor. The activation reaction for the charcoal is executed in the reactor in which the fluidized bed is maintained at a temperature of 805°C, and the produced active carbon is continuously obtained together with the alumina which is separated from the active carbon by means of a separate apparatus.

The results are as follows;

| | |
|---|---|
| Weight of partially activated carbon in the coarse granule form in the fluidized bed | 538 g |
| Amount of active carbon produced | 158 g/hr. |
| Physical properties of produced active carbon | |
| Packing density | 448 g/l |
| Benzene adsorption | 38.2 % |
| Iodine adsorption | 1230 mg/g |
| Hardness | 99.3 % |

EXAMPLE 2

Three reactors each of the same size as that of Example 1 are connected in series with each other as shown in FIG. 2, and into the first reactor there is continuously fed charcoal molded into pellets of 5 mm in average particle size at a rate of 1000 g/hr. on a rectifier provided in the first reactor. The charcoal in the first reactor is automatically fed onto the rectifier of the second reactor and then fed onto the rectifier of 1 the third reactor. High temperature gases of 800°C, 1280°C and 1280°C each containing 65 percent by volume of steam are respectively supplied into the first, second and third fluidized beds from the lower part of each reactor through the rectifier made of a refractory material at an apparent velocity of 22 cm/sec., 20 cm/sec. and 18 cm/sec. per section area of each fluidized bed, respectively. Into each fluidized bed, there is also charged alumina having an average particle size of 0.12 mm to the starting material and of 1.0 to 1.6 times volume to the charcoal. The activation reactions are executed simultaneously in each reactor, the first, second and third fluidized beds being maintained at a temperature of 645°C, 802°C and 508°C, respectively, and the active carbon produced is obtained continuously from the third reactor together with the alumina which is separated from the active carbon by means of a separate apparatus. The results are as follows.

| | |
|---|---|
| Weight of active carbon in the coarse granule form in the first fludized bed | 755 g |
| in the second fluidized bed | 505 g |
| in the third fluidized bed | 393 g |
| Amount of active carbon produced | 306 g/hr. |
| Physical properties of produced active carbon | |
| Packing density | 452 g/l |
| Benzene adsorption | 38.6 % |
| Iodine adsorption | 1250 mg/g |
| Hardness | 99.2 % |

As evidenced by the forgoing Examples 1 and 2, the present invention is advantageous over the prior art in that the produced active carbon is well carbonized with a suitable hardness and, therefore, the invention effectively provides a product of relatively higher quality, satisfying the commercial requirements.

What is claimed is:

1. A process for producing coarse particles of active carbon which consists essentially of continuously supplying to a fluidized bed, particles of carbon or a carbonaceous material from the group consisting of coke, charcoal, and coal having an average particle size of 2 to 20 mm with a finely powdered inert material having a particle size of from 0.05 to 2.0 mm, which inert material does not interfere with the reaction and can be readily separated from the active carbon thus-produced, said inert material being present in an amount of 1 to 4 times by volume of the carbon or carbonaceous particles, introducing a combustion gas, a waste gas or a hot waste gas of a temperature within the range of 600° to 2000°C containing 20 to 80 percent by volume of steam into the mixture of particles and inert material so as to execute the activation or the carbonization and activation of said particles while the mixture is forming a fluidized bed in the reactor, taking out the produced coarse particles of active carbon together with the inert material from the reactor, separating the produced coarse particles of active carbon from the inert material, and recycling said inert particles to said fluidized bed; and wherein in said process both the particles of carbon or carbonaceous material and the inert material are introduced to the lower portion of the fluidized bed and taken out from the upper portion of the fluidized bed to the outside while the gas flows to pass through the fluidized bed from the lower portion to the upper portion.

2. A process according to claim 1 wherein the carbon or carbonaceous material is selected from the group consisting of coconut shell charcoal, sawdust charcoal, charcoal, coke and anthracite coal and wherein the inert material is selected from the group consisting of alumina, silica, silica-alumina, a thermostable metal oxide, sodium chloride and potassium chloride.

3. A process according to claim 1 wherein the gas is a combustion gas obtained from the combustion of heavy oil, kerosene, natural gas, coal, tar, tar oil and sawdust.

4. A process according to claim 1 wherein the inert material has a particle size of from 0.08 to 1.0 mm.

* * * * *